(12) United States Patent
Aizawa et al.

(10) Patent No.: US 7,524,546 B2
(45) Date of Patent: Apr. 28, 2009

(54) THERMAL INSULATING MATERIAL AND POLLUTION CONTROL DEVICE USING THE SAME

(75) Inventors: Takuma Aizawa, Sagamihara (JP); Toshihiro Kasai, Sahamihara (JP); Takayuki Kawai, Sagamihara (JP); Toshiyuki Watanabe, Atsugi (JP)

(73) Assignee: 3M Innovative Properties Company, St. Paul, MN (US)

( * ) Notice: Subject to any disclaimer, the term of this patent is extended or adjusted under 35 U.S.C. 154(b) by 874 days.

(21) Appl. No.: 10/450,868

(22) PCT Filed: Dec. 13, 2001

(86) PCT No.: PCT/US01/47482

§ 371 (c)(1),
(2), (4) Date: Jun. 17, 2003

(87) PCT Pub. No.: WO02/053511

PCT Pub. Date: Jul. 11, 2002

(65) Prior Publication Data

US 2004/0057879 A1    Mar. 25, 2004

(30) Foreign Application Priority Data

Dec. 28, 2000    (JP)    ............................. 2000-403073

(51) Int. Cl.
| | | |
|---|---|---|
| *B32B 21/00* | (2006.01) | |
| *B32B 21/72* | (2006.01) | |
| *B32B 23/00* | (2006.01) | |
| *B32B 23/08* | (2006.01) | |
| *B32B 1/08* | (2006.01) | |
| *B29D 22/00* | (2006.01) | |
| *B29D 23/00* | (2006.01) | |
| *A47G 19/22* | (2006.01) | |

(52) U.S. Cl. ...................... 428/34.5; 428/400; 422/179; 422/181; 422/221; 60/299; 60/302; 55/DIG. 30; 55/523; 264/661; 264/653

(58) Field of Classification Search ................ 428/36.2, 428/36.3, 36.4, 299.4, 297.7, 300.4, 34.5, 428/400; 422/179, 180, 221, 222, 181; 60/299, 60/302; 55/DIG. 30, 523; 264/661, 653
See application file for complete search history.

(56) References Cited

U.S. PATENT DOCUMENTS 3,328,142 A    6/1967    Levecque (Continued)

FOREIGN PATENT DOCUMENTS

DE    198 08 518    8/1999

(Continued)

*Primary Examiner*—Michael C Miggins
(74) *Attorney, Agent, or Firm*—Harold C. Knecht, III

(57) ABSTRACT

A thermal insulating material which can be efficiently produced while the content of organic matters, such as organic fibers and/or an organic binder, is reduced to the same or lower degree as compared with the thermal insulating material used in a conventional pollution control device (e.g., catalytic converter), and which can be applied to a pollution control element (e.g., catalytic element) while avoiding, as much as possible, an unpleasant feeling to the operator. A thermal insulating material comprising a thermal insulating material body formed of a bulk material of inorganic fibers, and a coating provided on at least one surface of said thermal insulating material body.

25 Claims, 6 Drawing Sheets

U.S. PATENT DOCUMENTS

| | | | |
|---|---|---|---|
| 3,441,381 A | | 4/1969 | Keith et al. |
| RE27,747 E | | 9/1973 | Johnson |
| 3,771,967 A | * | 11/1973 | Nowak ................ 422/179 |
| 4,285,909 A | * | 8/1981 | Mizusawa et al. ......... 422/179 |
| 4,865,818 A | * | 9/1989 | Merry et al. ............ 422/179 |
| 5,290,522 A | * | 3/1994 | Rogers et al. ........... 422/179 |
| 5,869,010 A | | 2/1999 | Langer |
| 5,983,586 A | | 11/1999 | Berdan, II et al. |
| 6,726,884 B1 | * | 4/2004 | Dillon et al. ............ 422/179 |

FOREIGN PATENT DOCUMENTS

| | | | |
|---|---|---|---|
| EP | 0 551 532 | | 7/1993 |
| EP | 0551532 A1 | * | 7/1993 |
| EP | 0 719 912 | | 7/1996 |
| FR | 2 416 074 | | 8/1979 |
| JP | 57-61686 | | 4/1982 |
| JP | 59-10345 | | 1/1984 |
| JP | 61-239100 | | 10/1986 |
| JP | 2-182450 | | 7/1990 |
| JP | 6-239656 | | 8/1994 |
| JP | 7-286514 | | 10/1995 |
| JP | 8-226070 | | 9/1996 |
| JP | 11-166414 | | 6/1999 |
| WO | WO 01/83956 | | 11/2001 |

* cited by examiner

THERMAL INSULATING MATERIAL AND POLLUTION CONTROL DEVICE USING THE SAME

FIELD OF THE INVENTION

The present invention relates to a thermal insulating material, particularly, a thermal insulating material for use in a pollution control device and, more particularly, a pollution control device wherein a thermal insulating material is used to retain a pollution control element in a casing.

BACKGROUND OF THE INVENTION

Exhaust gas purifying systems using a pollution control device to purify the exhaust gas of an internal combustion engine, are well known. Pollution control devices include catalytic converters and exhaust gas filters (e.g., diesel particulate filters). For example, it is well known to use ceramic catalytic converters to purify an exhaust gas containing carbon monoxide (CO) and hydrocarbon (HC) exhausted from the engine of automobiles. In general, a pollution control device includes a pollution control element mounted in a housing. For example, a ceramic catalytic converter basically contains a honeycomb catalyst support (catalyst element) made of ceramic in a casing, i.e., housing made of metal.

Generally, the space between the pollution control element and the housing is filled with a thermal insulating material. For example, in a catalytic converter, the space between the catalyst support and the casing is filled with a thermal insulating material consisting typically of inorganic fibers and organic fibers and/or a liquid or pasty organic binder such as, for example, that disclosed in Japanese Unexamined Patent Publication (Kokai) No. 57-61686, 59-10345 or 61-239100. As a result, the thermal insulating material, with which the space is filled, retains the catalyst support, thereby making it possible to prevent a mechanical shock caused by impact and vibration, or a thermal shock caused by heat cycles from giving to the catalyst support. According to a catalytic converter with such a constitution, a desired operation can be realized because breakage or detrimental movement of the catalyst support does not occur.

The above-described exhaust gas purifying system is generally provided with an oxygen sensor and it controls the concentration of oxygen in the exhaust gas, thereby to effect optimum purification of the exhaust gas through a catalytic converter. It is considered to be preferred that the catalytic converter is operated at a higher temperature so as to improve purification of the exhaust gas and to improve the fuel cost. With the recent tightening of exhaust gas control due to protection of the global environment, further purification of the exhaust gas due to an increase in operating temperature tends to be effected. On the other hand, a nitrogen oxide ($No_x$) tends to be easily evolved in the exhaust gas as a result of an increase in operating temperature. Accordingly, it has been known that an air fuel ratio due to an accurate signal from an oxygen sensor is important in the exhaust gas purifying system.

However, the thermal insulating material as disclosed in the above publications (Kokai) can not be easily used, together with a high sensitivity oxygen sensor. The reason is as follows. That is, since an organic matter such as organic fibers and/or organic binder are added in the above thermal insulating material in a comparatively large amount, i.e. about 4 to 50% wt %, based on the total amount of the thermal insulating material, the organic matter is likely to be easily incorporated into the exhaust gas on initial operation of the catalytic converter, thereby to cause wrong operation of the exhaust gas purification system.

On the other hand, Japanese Unexamined Patent Publication (Kokai) No. 11-166414 discloses a thermal insulating material comprising crystalline alumina fibers as a principal component, wherein the content of an organic matter is reduced to 1 wt % or less. However, since the surface of this thermal insulating material is covered with a protective sheet, an additional complicated step of removing the protective sheet must be carried out after the thermal insulating material was disposed between a casing and a catalyst support so as to apply it to a catalytic converter. There is also a problem about disposal of the removed protective sheet.

Japanese Unexamined Patent Publication (Kokai) No. 6-239656 discloses a multi-layer structure thermal insulating material. This publication teaches to produce the multi-layer structure thermal insulating material by using a very small amount of a polymer aggregating agent of an organic matter. However, a complicated step of laminating a plurality of mats must be required because of a multi-layer structure of the thermal insulating material.

Japanese Unexamined Patent Publication (Kokai) No. 7-286514 discloses a holding seal material (corresponding to a thermal insulating material) made by treating a laminated material of inorganic fibers such as crystalline alumina fibers using a needle punching method. The holding seal material is likely to cause protrusion or scattering of inorganic fibers from the surface of the insulating material, although the organic matter is removed by calcining the laminated material. As a result, the end portion of the inorganic fibers tends to be directly contacted with the operator to impart an unpleasant feeling to him on incorporation of the above holding seal material into the catalyst converter.

As described above, various thermal insulating materials have hitherto been suggested to apply to a catalytic converter, however, still some room for improvement is left in any of thermal insulating materials.

SUMMARY OF THE INVENTION

It is, therefore, an object of the present invention to provide a thermal insulating material which can be efficiently produced while the content of organic matters such as organic fibers and/or an organic binder is reduced to the same or lower degree as compared with the thermal insulating material used in a conventional pollution control device (e.g., catalytic converter), and which can be applied to a pollution control element (e.g., catalytic element) while avoiding, as much as possible, an unpleasant feeling to the operator.

It is another object of the present invention to provide a pollution control device (e.g., a catalytic converter) using such an excellent thermal insulating material.

According to one aspect of the present invention, the above-described problems can be solved by providing a thermal insulating material comprising a thermal insulating material body formed of a bulk material of inorganic fibers, and a coating provided on at least one surface of the thermal insulating material body.

According to the present invention, there is also provided a pollution control device (e.g., a catalytic converter, an exhaust gas filter, etc.) comprising:

a casing, a pollution control element (e.g., a catalyst element, a filter element, etc.) disposed in the casing, and a thermal insulating material disposed between the casing and the pollution control element, characterized in that:

the thermal insulating material comprises a thermal insulating material body formed of a bulk material of inorganic fibers, and a coating provided on at least one surface of the thermal insulating material body.

Further, according to another aspect of the present invention, the above-described problems can be solved by providing a thermal insulating material comprising a thermally insulating material body formed of a bulk material of inorganic fibers, the thermally insulating material being substantially free of an organic substance and being formed, in at least a surface portion thereof, of inorganic fibers having a non-sharp tip produced upon thermal deformation of the inorganic fibers and partial fusion between the fibers.

Furthermore, according to the present invention, there is also provided a pollution control device (e.g., a catalytic converter, exhaust gas filter, etc.) comprising:

a casing, a pollution control element (e.g., a catalyst element, filter element, etc.) disposed in the casing, and a thermally insulating material disposed between the casing and the pollution control element, characterized in that:

the thermally insulating material comprising a thermally insulating material body formed of a bulk material of inorganic fibers, the thermally insulating material being substantially free of an organic substance and being formed, in at least a surface portion thereof, of inorganic fibers having a non-sharp tip produced upon thermal deformation of the inorganic fibers and partial fusion between the fibers.

DETAILED DESCRIPTION OF THE INVENTION

The present invention is further illustrated in accordance with the following embodiments. It is apparent to a person with an ordinary skill in the art that the present invention is not limited to the following embodiments, and various changes and modifications can be made in the invention without departing from the scope thereof. For example, while catalytic converter embodiments are used to illustrate the present invention, the present invention may also be useful with other types of pollution control devices.

Figure 1:
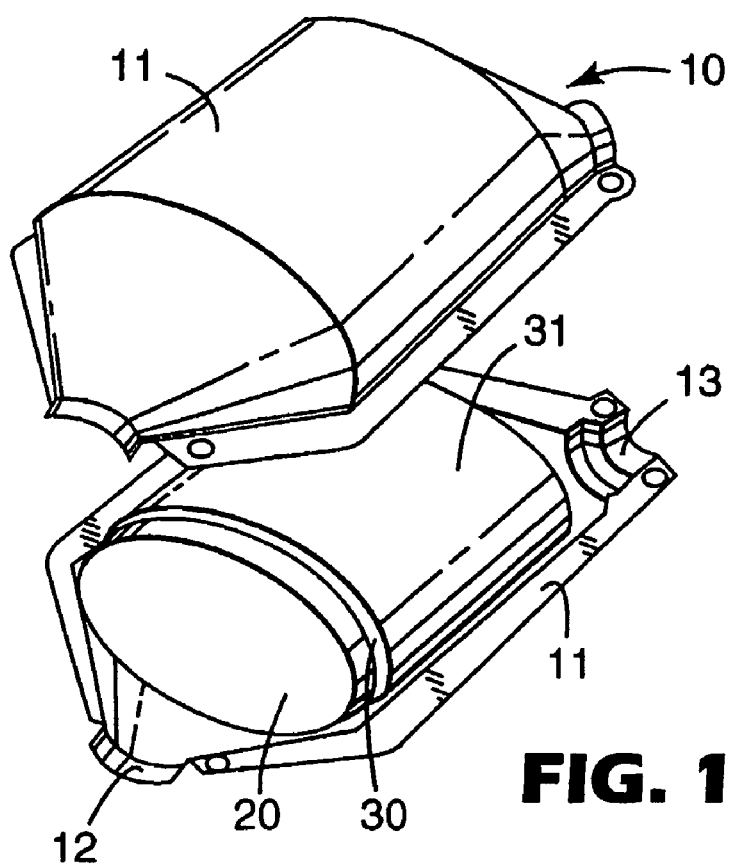
FIG. 1 is an exploded perspective view showing preferred one embodiment of the catalytic converter according to the present invention.
Figure 2:
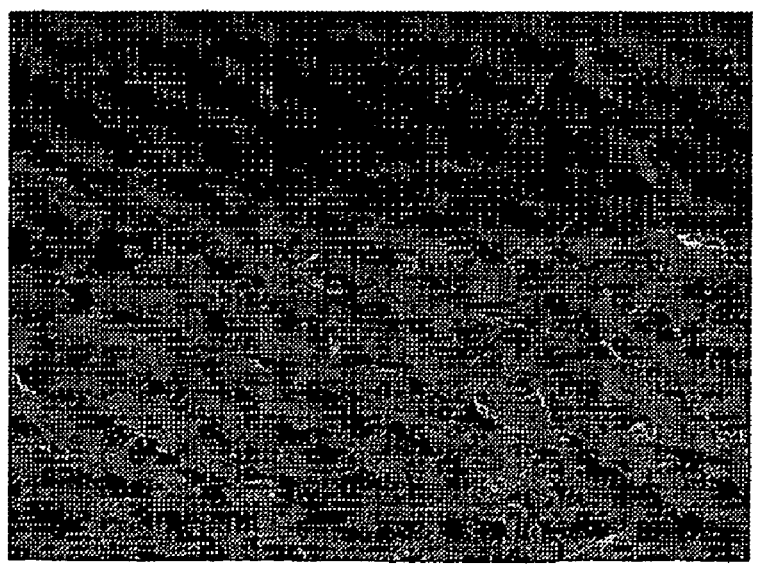
FIG. 2 is a SEM photograph showing the surface of the thermal insulating material made in Example 1.
Figure 3:
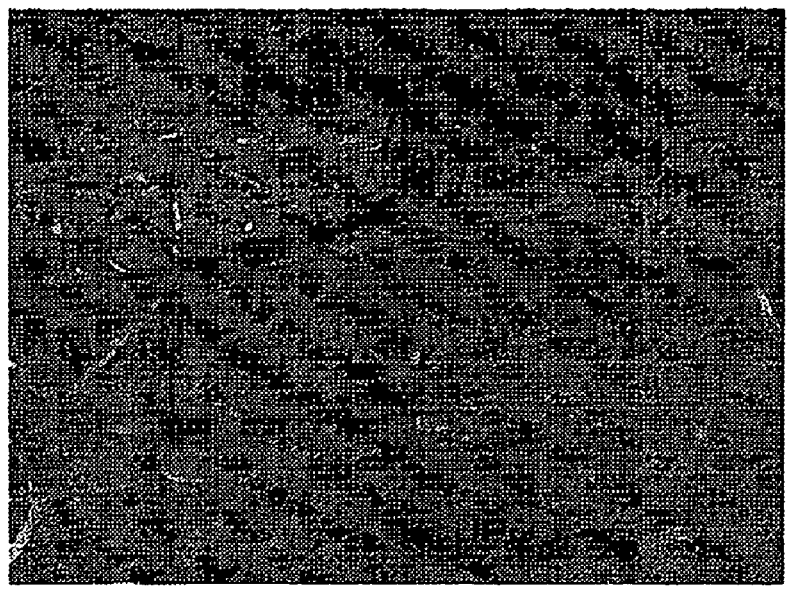
FIG. 3 is a SEM photograph showing the surface of the thermal insulating material made in Example 2.
Figure 4:
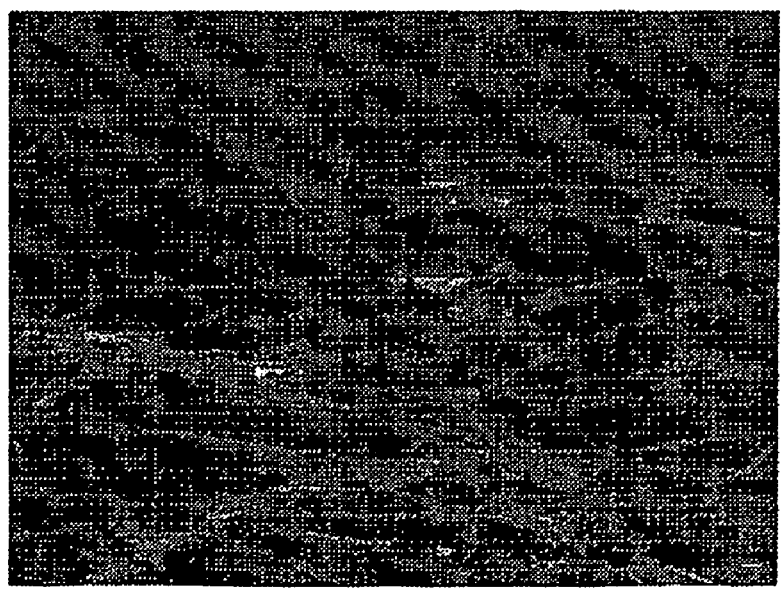
FIG. 4 is a SEM photograph showing of the surface of the thermal insulating material made in Example 3.

FIG. 1 is a perspective view showing typical one embodiment of a catalytic converter according to the present invention, wherein an exploded state of the catalytic converter is illustrated for easier understanding of its constitution. A catalytic converter 10 shown in the drawing is provided with a metal casing 11, a monolithic solid catalyst element 20 disposed in the metal casing 11, and a thermal insulating material disposed between the metal casing 11 and the catalyst element 20.

As described above and will be described in detail hereinafter, according to one aspect of the present invention, the thermal insulating material comprises a thermal insulating material body 30 formed from a bulk material of inorganic fibers and a coating 31 applied onto a surface thereof, or according to another aspect of the present invention, the thermally insulating material comprises a thermally insulating material body 30 (having no coating 31) formed of a bulk material of inorganic fibers and substantially free of an organic substance. Note that the thermally insulating material of the present invention are generally classified into two above-described constitutional embodiments, however, because these embodiments can provide the substantially same functions, the terms "thermally insulating material" used herein mean all the thermally insulating materials covered by both the first and second aspects of the present invention, unless otherwise specified. Further, with regard to the thermally insulating material according to the first aspect of the present invention, its thermal insulating material body 30 is also referred to as a "thermal insulating material" for convenience.

The thermal insulating material body 30 according to the first aspect of the present invention further comprises an integrated component of the inorganic fibers, and an organic matter is contained in the integrated component of the inorganic fibers in the amount of 3 wt % or less based on the total amount of the thermal insulating material body, coating and integrated component. On the other hand, the coating-free thermally insulating material body 30 according to the second aspect of the present invention comprises in at least a surface portion thereof inorganic fibers having a non-sharp tip produced upon thermal deformation of the inorganic fibers and partial fusion between the fibers.

Further, the catalytic converter 10 is provided with an exhaust gas inlet 12 and an exhaust gas outlet 13, each of which has a shape of truncated cone.

The solid catalyst element in the metal casing is made of a honeycomb structure catalyst support made of ceramic, which has a plurality of exhaust gas passages (not shown). The thermal insulating material of the present invention is disposed around the catalyst element. The thermal insulating material retains the catalyst element in the metal casing and seal the space formed between the catalyst element and the metal casing, thereby making it possible to prevent the exhaust gas from flowing with by-passing the catalyst element or to minimize such undesired flow. The catalyst element is retained in the metal casing firmly and elastically.

In the catalytic converter of the present invention, the metal casing can be made of various metallic materials known in this field in any shape according to the operation and effect. Preferred metal casing is made of stainless steel and has a shape as shown in FIG. 1. As a matter of course, the metal casing can be optionally made of metal such as aluminum, titanium, etc. or an alloy thereof in any suitable shape.

Similarly to the metal casing, the solid catalyst support can also be made of the same material as that employed in a conventional catalytic converter in the same shape. Proper catalyst element includes those which are well known to a person with an ordinary skill in the art and are produced from metal or ceramic. Useful catalyst element is, for example, disclosed in Reissued U.S. Pat. No. 27,747. The catalyst element made of ceramic is, for example, commercially available from Corning Inc. in U.S.A. For example, honeycomb catalyst supports made of ceramic are commercially available from Corning Inc. under the trade name of "CELCOR" and are commercially available from NGK Insulated Ltd. under the trade name of "HONEYCERAM", respectively. The catalyst element made of metal is, for example, commercially available from Behr GmbH and Co. in Germany. See Document No. 900500 of SAE Technical Document, Stroom et al., "Systems Approach to Packaging Design for Automotive Catalytic Converters", Document No. 800082 of SAE Technical Document, Howitt, "Thin Wall Ceramics as Monolithic Catalyst Support", and Document No. 740244 of SAE Technical Document, Howitt et al., "Flow Effect in Monolithic Honeycomb Automotive Catalytic Converter" with respect to the detailed description of the monolithic catalyst.

The catalyst to be supported on the above-described catalyst element is usually metal (e.g. platinum, ruthenium, osmium, rhodium, iridium, nickel, palladium, etc.) or metal oxide (e.g. vanadium pentaoxide, titanium dioxide, etc.) and is preferably used in the form of coating. See U.S. Pat. No. 3,441,381 with respect to the detailed description of coating of such a catalyst.

In the practice of the present invention, it is particularly preferred that a casing made of metal is basically made by, for example, containing a honeycomb catalyst support (catalyst element) made of ceramic, and that a catalyst element is made, for example, by supporting a catalyst layer (catalyst coating) made of noble metal such as platinum, rhodium and palladium on a honeycomb monolithic carrier made of ceramic. With such a constitution, an effective catalytic action can be exhibited at a comparatively high temperature.

According to the present invention, a thermal insulating material is disposed between the metal casing and the catalyst element contained therein. The thermal insulating material is preferably made of a single-layer thermal insulating material. Describing in detail, this thermal insulating material is basically comprises:

(first aspect of the present invention) a thermally insulating material body formed from a bulk material of inorganic fibers and a coating, or (second aspect of the present invention) a thermally insulating material body which is formed of a bulk material of inorganic fibers, is substantially free from an organic material, and has in at least its surface portion inorganic fibers having a non-sharp tip due to thermal deformation of the inorganic fibers and partial fusion between the fibers.

The inorganic fibers constituting the thermally insulating material are preferably ceramic fibers, for example, alumina, silica, silicon nitride, rock wool, aluminosilicate, zirconia or the like, and can be employed to retain the catalyst element because of thermal insulation properties, heat resistance and elasticity. In case where the inorganic fibers are made of alumina, the inorganic fibers can maintain the heat resistance and elasticity even at a high temperature higher than 900° C. As these inorganic fibers made of alumina, several kinds of inorganic fibers are commercially available from DYSON Co. under the trade name of "SAFFIL". Similar inorganic fibers made of alumina are commercially available from manufacturers such as DENKA, NITIAS, MITSUBISHI CHEMICAL INDUSTRIES Co. and the like.

According to the present invention, the thickness (average diameter) of the inorganic fibers is not limited, but the inorganic fibers preferably have the average diameter within a range from 2 to 4 μm. When the inorganic fibers have the average diameter of smaller than about 2 μm, the resulting thermal insulating material tends to be brittle and to lack in strength. On the other hand, when the inorganic fibers preferably have the average diameter larger than about 4 μm, it becomes difficult to form the thermal insulating material.

Similar to the thickness, the length of the inorganic fibers is not specifically limited. However, the inorganic fibers preferably have an average length within a range from 0.5 to 50 mm. When the average length of the inorganic fibers is smaller than about 0.5 mm, features of the fiber form may not be obtained. On the other hand, when the average length is larger than about 50 mm, it becomes difficult to enable the production process of the thermal insulating material to proceed smoothly.

In addition to the bulk material of the inorganic fibers, an integrated component of the inorganic fibers is further contained in the thermal insulating material according to the first aspect of the present invention. This integrated component has a function of retaining the inorganic fibers, and accelerating aggregation of the inorganic fibers sometimes. According to the present invention, this integrated component can be composed of a binding medium made of crimped organic fibers (organic matter), namely, a binder. Describing in detail, these crimped organic fibers are preferably composed of a heat-resistant core and a sheath-core structure wherein the core is covered with a fused clad.

The fused clad of the organic fibers having the above-described sheath-core structure is softened at a comparative low temperature within a range from 110 to 220° C., thereby making it possible to adhere and bond the organic fibers each other or the inorganic fibers with the organic fibers. The heat-resistant core is crimped and retains the shape even at a comparatively high temperature within a range from 200 to 250° C., thereby making it possible to physically interlock the inorganic fibers.

Thus, a liquid or pasty organic binder, which has been required essentially to use so as to impart a mechanical strength to the thermal insulating material in the prior art, is not required in the practice of the present invention. Accordingly, the crimped organic fibers as the binder to be used in the present invention themselves can firmly retain the inorganic fibers by not only adhesion but also a physical interlock. Particularly, it has been found that the comparable mechanical strength to that in the prior art can be imparted to the thermal insulating material even if the content of the binder is reduced to about 3 wt % or less so as to avoid a wrong operation of the exhaust gas purification system as possible.

Typical fused clad in the constitution of the crimped organic fibers is, for example, made of modified polyethylene terephthalate (PET), polyethylene (PE), polypropylene, polyester, nylon, polybutylene terephthalate or the like. The modified PET is particularly preferred because it is fused by heating (120 to 140° C.) in the drying step on forming of the thermal insulating material.

The typical heat-resistant core in the constitution of the crimped organic fibers is composed of PET, PE, polypropylene, polyester, nylon, polybutylene terephthalate or the like. PET is particularly preferred in view of the heat resistance (250° C.) to heating in the above-described drying process.

The length of the crimped organic fibers used as the binder is not specifically limited, but the crimped organic fibers preferably have an average length of 1 to 20 mm. When the average length is smaller than about 1 mm, interlock between the organic fibers each other or that between the inorganic fiber and organic fibers is reduced, thereby making it impossible to make use of advantages derived from the shape of the crimped fibers. On the other hand, when the average length is larger than about 20 mm, winding on equipments during the process or interlock between the fibers becomes severe to cause drastic scatter in composition distribution or thickness, thereby making it difficult to make a good thermal insulating material. More preferably, the organic fibers have an average length within a range from 5 to 15 mm.

The thickness (average diameter) of the crimped organic fibers is not specifically limited, but preferably the crimped organic fibers have an average diameter within a range from 1 to 4 deniers (about 0.11 to 0.44 g/km). When the average diameter of the organic fibers is smaller than about 1 denier, the amount of the fused clad on the surface of the organic fibers is reduced and the resulting strength tends to be smaller than the desired strength. On the other hand, when the average diameter of the organic fibers is smaller than about 4 deniers, the surface area based on the weight is reduced and, therefore, it becomes impossible to effect efficient fusion, resulting in poor strength.

An inorganic or organic aggregating agent may be contained in the integrated component in an amount smaller than that of the binder, thereby accelerating aggregation and integration of the inorganic fibers in the production of the thermal insulating material described hereinafter. For example, the inorganic aggregating agent includes, but is not specifically limited to, sepiolite, montmorillonite, bentonite, alumina sol, colloidal silica or the like. Particularly, as a result of utilization of surface charge, the organic aggregating agent (organic matter) can not only accelerate integration with the inorganic fibers to reduce the thickness of the thermal insulating material, but also reduce the amount of the binder of the organic fibers. That is, since the inorganic fibers have a negative charge, if the positively charged aggregating agent is added to the integrated component, the opposed inorganic fibers may be integrated through the aggregating agent. Also the organic aggregating agent is not specifically limited but includes, for example, amide polyacrylate, polyvinyl alcohol, acrylic polymer, urethane, vinyl acetate, rubber, latex or the like. Particularly, amide polyacrylate is commercially available as a diluted product from MITSUI SAITEK Co. under the trade name of "AKURAK 135" and "AKURAK 304E".

In the practice of the present invention, it is also preferred to add those, which are generally used as a paper strength enhancer in the technical field of paper-making, in combination with the aggregating agents. The paper strength enhancer is an additive for improving the normal strength or wet strength of the paper and includes, for example, amide polyacrylate. The paper strength enhancer is effective to improve the dry strength of the thermal insulating material in the thermal insulating material of the present invention. Suitable paper strength enhancer is, for example, commercially available from HARIMA CHEMICALS Co., under the trade name of "HERMIDE B-15".

However, the thermal insulating material body constituting the thermal insulating material is not limited to those described above, and an inorganic binding medium of glass fibers may be used as an integrated component of an inorganic component in place of organic fibers having the above-described sheath-core structure as far as requirements for thermal insulating material body are satisfied. Also in such a case, the wrong operation of the purification system can be further reduced or avoided. According to the present invention, the glass fibers can impart the fixed strength and durability to the thermal insulating material while maintaining the inorganic fibers when the space between the inorganic fibers is filled with the softened or molten glass fibers. The glass fibers are preferably made of a non-alkali glass in view of prevention of embrittlement caused by diffusion of an alkali element into the inorganic fibers, although the material is not specifically limited. Also the length is not specifically limited, but is usually within a range from about 1 to 25 mm, and preferably from about 8 to 12 mm.

Alternatively, the thermal insulating material body may be those obtained by calcining a laminated material of inorganic fibers such as crystalline alumina fibers, after treatment of the fibers using a needle punching method. Such a thermal insulating material body is commercially available from MITSUBISHI CHEMICALS Co., Ltd. under the trade name of "MAFTEC BLANKET" as a holing seal material for catalyst converter.

Furthermore, at least one, preferably both surfaces, of the above-described thermal insulating material body has/have a coating applied thereto. The coating is not used herein to hold or bind the mat together, however, it is used to prevent protrusion or scattering of the inorganic fibers from the surface of the thermal insulating material body, i.e., to modify the surface of the thermal insulating material, without lowering the mechanical strength and other properties of the thermal insulating material. As a result, the thermal insulating material of the present invention can prevent the end portion to directly contact with the operator on incorporation of it into a catalyst converter, thereby making it possible to remove an unpleasant feeling to the operator.

The material of the coating is not limited as far as the content of organic matters in the thermal insulating material can be reduced as possible. The coating may be formed of an organic polymer compound, for example, rubber polymer such as acrylic polymer of polyacrylate, which is commercially available from NIPPON ZEON Co., Ltd. under the trade name of "LX-816", urethane polymer, or polyacrylonitrile-butadiene rubber (NBR), or polyvinyl alcohol. Preferably, the coating is formed of an inorganic compound, for example, an alkali silicate such as potassium silicate or sodium silicate, or a combination thereof, in view of reduction of the organic matters.

The above-described thermal insulating material can be produced according to various well-known and conventional procedures. For example, the thermal insulating material using as the integrated component organic fibers having the sheath-core structure may be produced in accordance with the following preferred method.

First, inorganic fibers and organic fibers (binder) are put in water, and these fibers are opened and mixed.

While stirring the inorganic fibers and organic fibers slowly, an inorganic or organic aggregating agent is added to prepare a slurry. Thereafter, a sheet is formed by paper-making of the resulting slurry. The resulting formed article is squeezed to previously remove excess water. Subsequently, the formed article is heated and dried at a predetermined temperature with pressing, thereby to molten the fused clad on the surface of the organic fibers and to adhere and bond the organic fibers each other or the inorganic fibers with the organic fibers, thus obtaining a single-layer thermal insulating material (thermal insulating material body). This operation can be carried out by putting the formed article in an oven and heating and drying it at 170° C. over five minutes, for example.

Then, the resulting thermal insulating material body is completely dried by using a drier. It is understood that the adhering and bonding of the organic fibers each other or the inorganic fibers with the organic fibers, initiated in the previous heating and drying step, are completed in the process of this final drying step.

Then, at least one of the thermal insulating material body is coated with the above-described coating material by using a known and conventional technique, i.e. spraying or coating. Usually, at least one, preferably both surfaces, of the thermal insulating material body is/are coated after the coating material was diluted to two-ten times with a solvent (e.g. water or an organic solvent). Thus, a desired thermal insulating material can be obtained.

The thermally insulating material according to the second aspect of the present invention comprises a thermally insulating material body formed by a bulk material of inorganic fibers, and it does not contain a substantial amount of organic substance. In this thermally insulating material, the inorganic fibers used in the formation of the thermally insulating material body preferably include ceramic fibers such as alumina fibers as in the above-described formation of the thermally insulating material according to the first aspect of the present invention. With regard to the inorganic fibers and production of a bulk material of such fibers, it should be referred to the above detailed descriptions.

The formation of a thermally insulating material body from a bulk material of inorganic fibers is preferably carried out under the conditions which enable to exclude a substantial amount of organic substances, as impurities, from the resulting thermally insulating body. Particularly, it is preferred to heat a bulk material of inorganic fibers to an elevated temperature through application of calcination. More particularly, it is preferred to felt a laminate of ceramic fibers by needle punching and other methods to form a bulk material of ceramic fibers having an increased bonding strength between the laminated layers, followed by calcining the bulk material at an elevated temperature sufficient to dissipate the contained organic substances directly or through their decomposition. The calcination temperature of the bulk material of ceramic fibers may be widely varied depending upon particulars of the ceramics used and lamination conditions of the bulk material, however, generally, it is in the range of about 300 to 800° C. Note, in place of production of the thermally insulating material body according to the above method, it may be utilized any commercially available products, for example, "MAFTEC BLANKET" (trade name), referred above to, commercially available as a holding seal material for catalyst converter. The "MAFTEC BLANKET" is characterized by being in the form of mat and containing no organic substance, because it is produced by needle punching a laminate of crystalline alumina fibers, followed by calcinating the needle punched product.

In the production of the thermally insulating material body, according to the present invention, the heating treatment is carried out at a temperature higher than a deformation temperature of inorganic fibers, preferably, ceramic fibers. Note, the terms "deformation temperature" used herein are intended to mean a temperature at which, during the heating treatment, the inorganic fibers constituting the thermally insulating material body, particularly their surface portions, can be at least partly subjected to heat deformation such as softening or fusion, thereby changing their sharp tips into non-sharp, generally round tips. Since any sharp portions are removed from the surface of the resulting thermally insulating material body, users can handle the thermally insulating materials without suffering from any undesired feeling due to contact with sharp tips of the fibers. At the same time, since the inorganic fibers can be at least partly fused to the adjacent inorganic fibers upon thermal deformation of the inorganic fibers, scattering of the damaged inorganic fibers can be prevented, even if the inorganic fibers are damaged. Especially, such prevention of scattering of the inorganic fibers are worthful to users in view of working environment.

The heating treatment of the thermally insulating material body is generally carried out at a temperature beyond a deformation temperature of the inorganic fibers. That is, the heating temperature can be varied depending upon particulars (for example, elements, compositions and crystal structures) of the inorganic fibers. For example, when the thermally insulating material body is "MAFTEC BLANKET" mentioned above, suitable heating temperature is about 1594 to 1840° C. Further, any heating means may be used in this heating treatment, and suitable heating means include, for example, gas burners such as oxygen-hydrogen gas burner and propane gas burner in view of their capability of high temperature heating. Using these heating means, the intended heating treatment can be easily completed by instantly heating the thermally insulating material body with the burners.

In the above-mentioned heating treatment of the thermally insulating material body, the inventors have considered as follows. Since they already have a form of oxides, the inorganic fibers used as a bulk material in the formation of the thermally insulating material body are neither burned nor oxidized during the heating treatment, that is, it is considered in principle that a weight loss of the fibers is not resulted in this treatment except for the weight loss of the fibers due to scattering of the fibers during an initial stage of the treatment. During the heating treatment, the thermally insulating material body is instantly heated with the burner, followed by being left for a moment to cool it. In this process of softening, fusion and cooling, the inorganic fibers, appearing on the uppermost surface of the thermally insulating material body, are considered to generate variation of the configuration and crystallinity thereof. And, in this process, the instantly fused fibers can play the following two roles. One role of the inorganic fibers is their function as a binder. That is, the fused fibers can bond the adjacent fibers to each other, thereby enabling to form a large network structure of the fibers from individually separated and straight fibers having no branched portion. It is expected that the network structure of the fibers can effectively inhibit undesirable scattering of the damaged fibers. Another role of the fibers based on a surface tension of the fused fibers. That is, due to the surface tension of the fused fibers, a tip portion of the fibers is rounded with reduction of a ratio of sharp tips in the fibers, thereby unpleasant feeling can be removed. According to the present invention, since these two roles can be simultaneously attained, surface properties of the thermally insulating material made of inorganic fibers can be remarkably and effectively improved.

In addition, when the thermal insulating material of the present invention is used to retain the catalyst support, it may be optionally cut into a predetermined shape. Since the resulting thermal insulating material is a single layer, a complicated production step is not required, like a multi-layer thermal insulating material, and the thermal insulating layer can be produced by a well-known and conventional procedure. This thermal insulating layer can retain the fixed shape without using a protective sheet as described in Japanese Unexamined Patent Publication (Kokai) No. 11-166414. Accordingly, this thermal insulating layer may be only disposed at the space between the metal casing and catalyst support without attaching or removing the protective sheet. That is, when using this thermal insulating layer, the catalytic converter can be easily assembled in a conventional manner without using any additional device.

The thermal insulating material according to the present invention, as will be described in the following examples, has the bulk density enough to hold the catalyst support, along with the tensile strength and elongation enough to endure winding around the catalyst support, and thus it can advantageously function as mounting mats. Even if the above-described coating is applied to a surface of the thermally insulating material, the coating has substantially no influence on the function of the insulating material.

EXAMPLES

The present invention will now be described with reference to its examples. The present invention is not limited to the following examples.

Production of Thermal Insulating Material

Example 1

First, a coating material of polyacrylic acid (manufactured by NIPPON ZEON Co., Ltd. under the trade name of "LX-816", solid content of 42%) was diluted with water at a dilution degree of 5 time to prepare a coating solution. Both surfaces of a thermal insulating material body (manufactured by MITSUBISHI CHEMICALS Co., Ltd. under the trade name of "MAFTEC BLANKET") composed mainly of a laminated material of inorganic fibers of crystalline alumina were spray coated with the coating solution. The coating weight of the coating solution was controlled so that the weight of the organic matter containing the coating material is 1% or less based on the total weight. The coating solution was dried to obtain a thermal insulating material.

Example 2

In the same manner as in Example 1, except that both surfaces of the thermal insulating material body were coated with about 0.3 g of a coating solution (manufactured by ODEC Co. under the trade name of "SERACOAT 22-T") of an aqueous potassium phosphate solution by spraying and then dried, a thermal insulating material was made.

Example 3

In the same manner as in Example 2, except that both surfaces of the thermal insulating material body were coated with about 0.3 g of an aqueous potassium silicate solution and dried, and then further coated with about 0.3 g of a coating solution (manufactured by ODEC Co. under the trade name of "MASTER SEAL") of an aqueous aluminum phosphate solution by spraying, and then dried, a thermal insulating material was made.

Comparative Example 1

In this example, the thermal insulating material bodies used in Examples 1 to 3 were used as they are, for comparison. These thermal insulating material bodies are well known as a holding seal material for catalyst converter and have a bulk density of 0.09 to 0.11 g/cm$^3$ and a tensile strength of 1000 to 1500 MPa.

Example 4

First, a bulk material (manufactured by MITSUBISHI CHEMICALS Co., Ltd. under the trade name of "MAFTEC BULK") composed mainly of inorganic fibers of crystalline alumina was fibrillated in 47.6 g of water. These inorganic fibers were simply mixed in with 6 g of an inorganic binding medium composed of glass fibers (manufactured by NIPPON PLATE GLASS Co., Ltd. under the trade name of "MICRO-GLASS") and 2.4 g of an inorganic aggregating agent composed of cepiolite during making of the thermal insulation material body, and then the mixture was formed into a mat by using a paper-making method. The resulting mat was pressed and dried.

Then, both surfaces of the mat were coated with about 0.3 g of the coating solution of the aqueous potassium silicate solution used in Example 2 by spraying and dried. The mat coated with the coating solution was put in an electric oven at 800° C. for one hour to obtain a thermal insulating material wherein inorganic fibers are fused as a result of softening of glass fibers.

Comparative Example 2

In the same manner as in Example 4, except that the mat was not coated with the coating solution by spraying for comparison, a thermal insulating material was made.

Example 5

In the same manner as in Example 4, except that the following mixture of a binding medium, an aggregating agent and a paper strength enhancer was used in place of 6 g of the inorganic binding medium composed of glass fibers (microglass) and 2.4 g of the inorganic aggregating-agent composed of cepiolite, a thermal insulating material was made.

(Binding Medium)
Organic fibers (thickness: 0.11 g/km, manufactured by YUNITIKA FIBER Co., Ltd. under the trade name of "MELTY 4080")
Organic binder (trade name of "LX-816")

(Aggregating Agent)
Inorganic Aggregating Agent (Cepiolite)
Organic aggregating agent (manufactured by MITSUI SAITEK under the trade name of "ACULAK 135")
Organic aggregating agent (manufactured by MITSUI SAITEK under the trade name of "ACULAK 304E")

(Paper Strength Enhancer)
Product of HARIMA CHEMICALS Co., under the trade name of "HERMIDE B-15"

The content of the organic matter in the aggregating agent and paper strength enhancer used herein was calculated. As a result, a total amount of the organic matter in ACULAK 135, CULAK 304E and HERMIDE B-15 was 3% based on the total weight of the thermal insulating material. Then, both surfaces of the resulting mat were coated with about 0.03 g of a coating solution of an aqueous potassium silicate solution by spraying and dried to obtain a thermal insulating material.

Comparative Example 3

In the same manner as in Example 5, except that the mat was not coated with the coating solution by spraying for comparison, a thermal insulating material was made.

Observation of Thermal Insulating Material

The surface of the thermal insulating materials made in Examples 1 to 5 and Comparative Examples 1 to 3 was observed by using a scanning electron microscope. As a result, microphotographs (SEM photographs) shown in FIGS. 2 to 9 were obtained.

As shown in FIGS. 2 to 4, FIG. 6 and FIG. 8, the thermal insulating materials of Examples 1 to 5 have inorganic fibers laid down on the surface. Furthermore, it is also observed that the inorganic fibers are closely bonded each other through organic and inorganic binding mediums. Accordingly, such a thermal insulating material can prevent protrusion or scattering of inorganic fibers while the content of organic matters such as organic fibers and/or an organic binder is reduced to the same or higher degree as compared with a conventional catalytic converter. Thus, it is made possible to avoid an unpleasant feeling caused by direct contact of the thermal insulating material with the end portion of the inorganic fibers due to the above-described protrusion or scattering when the thermal insulating material is incorporated into the catalyst converter by the operator. A wrong operation of an exhaust gas purification system hardly occurs.

Figure 5:
FIG. 5 is a SEM photograph showing the surface of the thermal insulating material made in Comparative Example 1.
Figure 6:
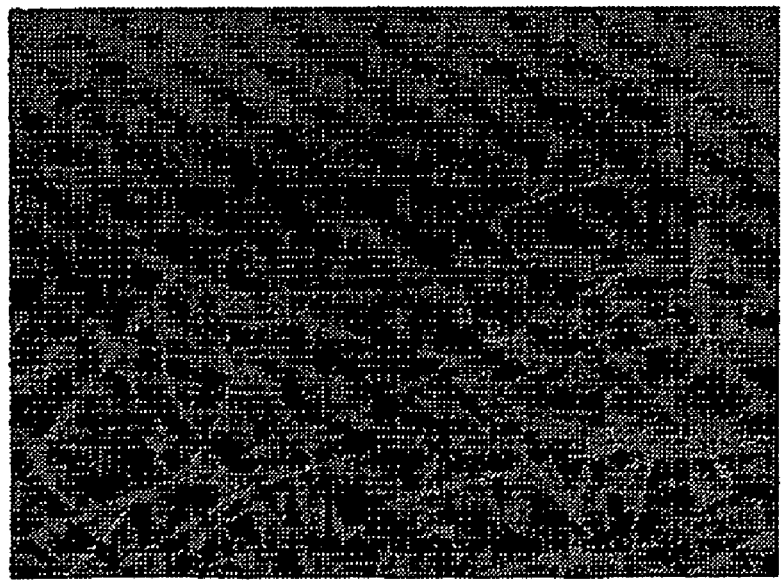
FIG. 6 is a SEM photograph showing the surface of the thermal insulating material made in Example 4.
Figure 7:
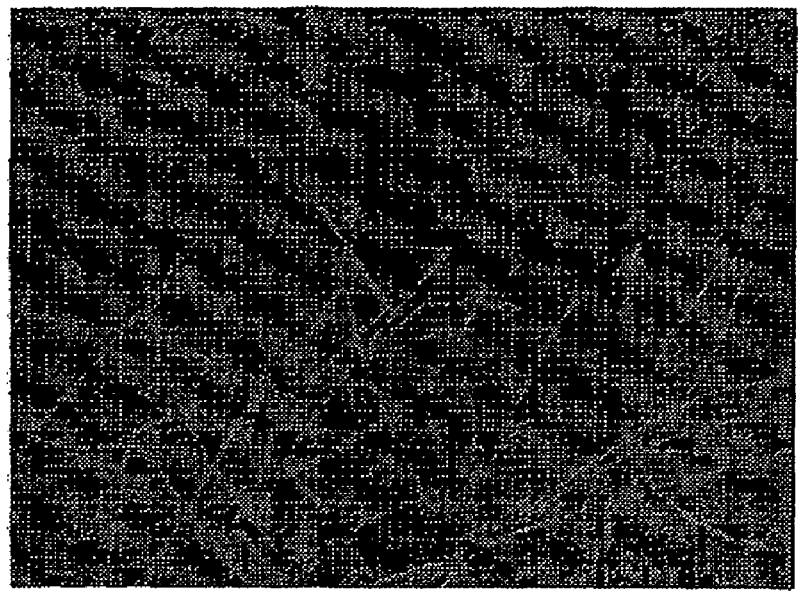
FIG. 7 is a SEM photograph showing the surface of the thermal insulating material made in Comparative Example 2.
Figure 8:
FIG. 8 is a SEM photograph showing the surface of the thermal insulating material made in Comparative Example 3.
Figure 9:
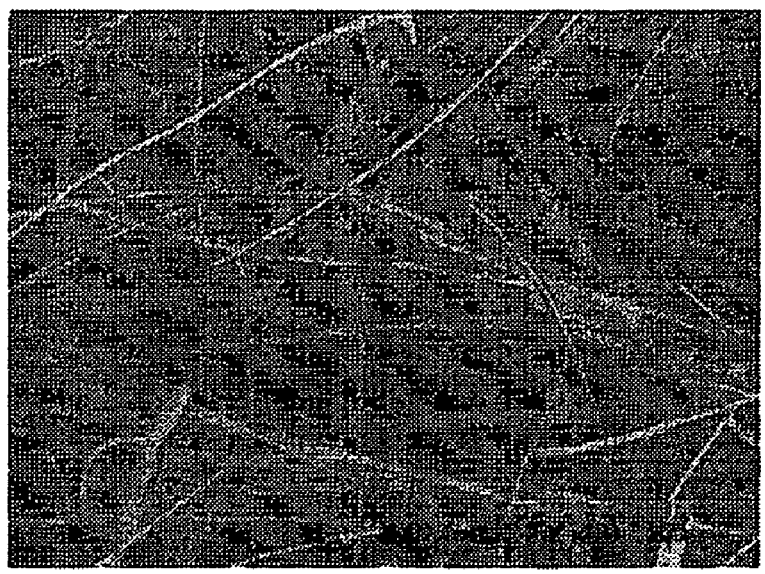
FIG. 9 is a SEM photograph showing the surface of the thermal insulating material made in Example 5.

Contrary to the above results, in the thermal insulating materials of Comparative Examples 1 to 3, the inorganic fibers raise a nap on the surface as shown in FIG. 5, FIG. 6 and FIG. 9. Accordingly, when such a thermal insulating material is incorporated into the catalyst converter by the operator, the thermal insulating material is directly contacted with the end portion of the inorganic fibers, thereby to impart an unpleasant feeling to the operator.

Evaluation Tests of Thermal Insulating Material

The thermal insulating materials produced in Examples 4 and 5 were evaluated with respect to the bulk density (g/cm$^3$), the tensile strength (MPa), and the elongation (%). The bulk density was determined as follows. That is, an average thickness of a sample obtained by cutting a thermal insulating material into a square having a side of 220 mm was determined from each thickness at five points, i.e. four points closer to corners and central one point, and then the above surface density was divided by the resulting average thickness to calculate the bulk density. After the thermal insulating material was cut into a rectangle having a width of 25 mm and a length of 180 mm, the stretching rate and elongation were measured at room temperature using an autograph manufactured by SHIMADZU Corp. At this time, the stretching rate was controlled to 20 mm/minutes.

It has been found that the thermal insulating material of Example 4 has a bulk density of 0.14 g/m$^3$, a tensile strength of 0.034 MPa and an elongation of 0.9%. It has also been found that the thermal insulating material of Example 5 has a bulk density of 0.16 g/m$^3$, a tensile strength of 0.045 MPa and an elongation of 3.39%. As is apparent from these measurement values, these thermal insulating materials have enough bulk density to hold the catalyst support, enough tensile strength and elongation to endure winding around the catalyst support while reducing the content of organic matters.

Example 6

A laminate of inorganic fibers made mainly of crystalline alumina (trade name "MAFTEC BLANKET", product of Mitsubishi Chemical Co., Let.) was provided, and cut into a rectangular strip (15 cm width and 20 cm length) to form a starting material of the thermally insulating material. On the other hand, an oxygen-hydrogen gas burner was provided, and burned, while controlling a supply amount of the gases at oxygen of 20 l/min. and hydrogen of 40 l/min., to obtain a stable flame. A starting material of the thermally insulating material produced in the above step was inserted in a central portion of the flame (total length of about 20 cm) showing a relatively high temperature of at least about 2000° C., and the starting material was exposed to the flame for about 8 seconds. After it was turned over, the starting material was again exposed to the flame for about 8 seconds. After completion of heating treatment of both the top and back surfaces of the starting material, a surface of the resulting thermally insulating material was checked with the naked eye. In contrast to the unheated "MAFTEC BLANKET" (trade name), it was observed that according to the present invention, fluffing of the fibers can be prevented along with more flatness of the material surface. Further, when a surface of the thermally insulating material was directly contacted with a finger top, no bad feeling, typically prickliness, could not be observed in contrast to the surface of unheated material.

Figure 10:
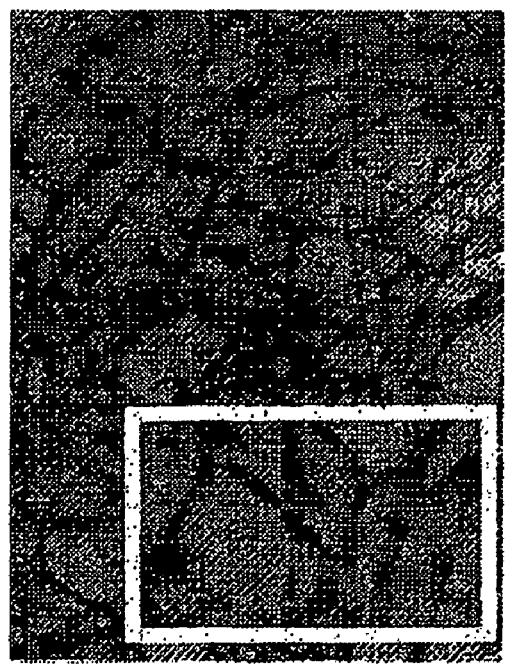
FIG. 10 is an optical microphotograph showing the surface of thermally insulating material mad in Example 6.

Next, a surface of the same thermally insulating material was observed with an optical microscope to obtain the microphotograph shown in FIG. 10. Note in this microphotograph that a part of the material surface was enlarged to assist in understanding of the condition of the inorganic fibers. As is understood from the microphotograph, since inorganic fibers were fused and solidified in a surface portion of the thermally insulating material, a fusion of the fibers was generated at crossing of the fibers, and thus a dense network structure of the fibers was produced. The network structure, even if any shock is applied to the thermally insulating material to thereby form partially damaged fibers, can safely retain the damaged fibers portion with the remaining network structure, and thus can prevent undesirable scattering of the fiber fragments. Further, even if any strong shock is applied to the insulating material with remarkable damage of the fibers, along with separation of fragments of the insulating material, because such fragments are not constituted by a single fiber, but are constituted from a block of two or more fused fibers, scattering of the fragments in air can be prevented, in contrast to long time scattering of fine fiber particles in air. Furthermore, exposed tips of the fibers cannot be easily observed, whereas such exposed tips are considered to be included in the insulating material. The reason is considered to be due to inclusion of such tips in the network structure of the fibers. In addition, with regard to minor amounts of exposed tips of the fibers, they bad rounded tip configuration due to fusion and cooling of the fibers. Moreover, since the thermally insulating material has a varied configuration of fibers on only a surface portion thereof, if its properties are evaluated through a full length of the material, their excellent properties are not adversely affected by such variation of configuration.

Figure 12:
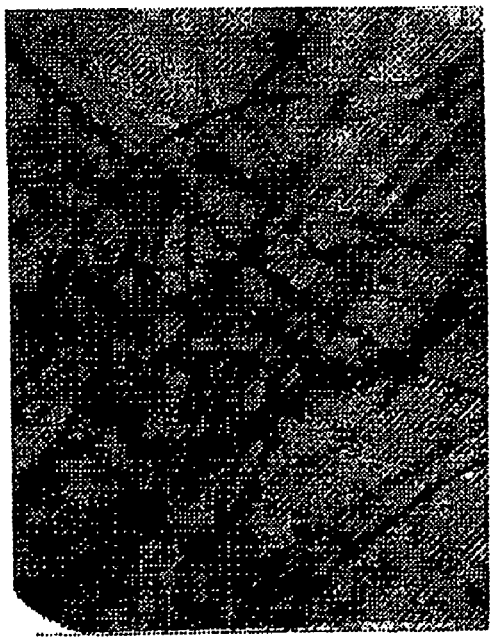
FIG. 12 is an optical microphotograph showing the surface of the holding seal material of the conventional catalytic converter.

For the reference, FIG. 12 is a microphotograph of the surface of the unheated laminate of inorganic fibers (trade name "MAFTEC BLANKET"). As is understood from the microphotograph, the laminate is constituted from a plurality of fibers, however, it has no network structure formed upon interlocking of the fibers. Further, many tips can be found in the fibers, however, no rounded tip can be seen.

Example 7

A laminate of inorganic fibers made mainly of crystalline alumina (trade name "MAFTEC BLANKET", product of Mitsubishi Chemical Co., Let.) was provided, and cut into a rectangular strip (15 cm width and 20 cm length) to form a starting material of the thermally insulating material. On the other hand, an oxygen-hydrogen gas burner was provided, and burned, while controlling a supply amount of the gases at oxygen of 30 l/min. and hydrogen of 60 l/min., to obtain a stable flame. A starting material of the thermally insulating material produced in the above step was inserted in a central portion of the flame (total length of about 30 cm) showing a relatively high temperature of at least about 2000° C., and the starting material was exposed to the flame for about 6 seconds. After it was turned over, the starting material was again exposed to the flame for about 6 seconds. After completion of heating treatment of both the top and back surfaces of the starting material, a surface of the resulting thermally insulating material was checked with the naked eye. As in Example 6, in contrast to the unheated "MAFTEC BLANKET" (trade name), it was observed that according to the present invention, fluffing of the fibers can be prevented along with more flatness of the material surface. Further, when a surface of the thermally insulating material was directly contacted with a finger top, no bad feeling, typically prickliness, could not be observed in contrast to the surface of unheated material.

Figure 11:
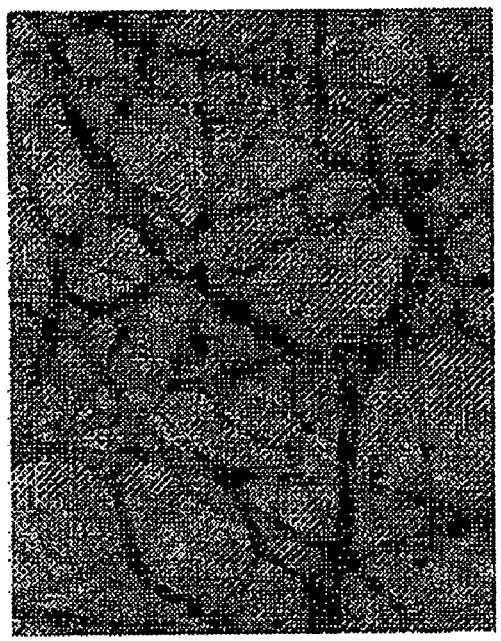
FIG. 11 is an optical microphotograph showing the surface of the thermally insulating material made in Example 7.

Next, a surface of the same thermally insulating material was observed with an optical microscope to obtain the microphotograph shown in FIG. 11, which is similar to that of FIG. 10. That is, as in Example 6, in the surface portion of the thermally insulating material of this example, a fusion of the fibers was generated at crossing of the fibers, and thus a dense network structure of the fibers was produced. The network structure, even if any shock is applied to the thermally insulating material, can prevent undesirable scattering of the fiber particles. Further, even if any strong shock is applied to the insulating material with remarkable damage of the fibers, the network structure can prevent long term scattering of the resulting fragments in air. Furthermore, exposed tips of the fibers have rounded tip configuration due to fusion and cooling of the fibers. Moreover, since the thermally insulating material has a varied configuration of fibers on only a surface portion thereof, if its properties are evaluated through a full length of the material, their excellent properties are not adversely affected by such variation of configuration.

According the present invention there can be provided a thermal insulating material which is efficiently produced while the content of organic matters such as organic fibers and/or an organic binder is reduced to the same or higher degree as compared with a conventional catalytic converter, and which is applied to a catalyst converter while an unpleasant feeling to the operator is avoided as possible.

Further, according to the present invention, since the thermally insulating material can be formed from only a bulk material of inorganic fibers, it becomes possible to reduce the production steps and costs as a result omission of the coating from the thermally insulating material, along with improvement in hand feeling and prevention of scattering of fibers, i.e., consideration of labor hygiene.

Furthermore, according to the present invention, there can be efficiently produced and provided a catalytic converter, which has high performances and does not cause a wrong operation of an exhaust gas purification system by using such an excellent thermal insulating material.

We claim:

1. A thermal insulating sheet material comprising:
a bulk portion composed mainly of ceramic fibers substantially free of an organic substance; and
a surface portion wherein the ceramic fibers are at least partially fused together and have non-sharp tips,
said thermal insulating sheet material being in a sheet form that can be handled and wrapped around a pollution control element before being disposed in a pollution control device.

2. The thermal insulating sheet material of claim 1, wherein the ceramic fibers comprise crystalline alumina fibers.

3. The thermal insulating sheet material of claim 1, wherein the ceramic fibers maintain heat resistance and elasticity at temperatures higher than 900° C.

4. The thermal insulating sheet material of claim 1, wherein the ceramic fibers comprise alumina, silica, silicon nitride, rock wool, aluminosilicate, zirconia, or a combination thereof.

5. The thermal insulating sheet material of claim 1, wherein the ceramic fibers have an average fiber diameter of about 2 to about 4 μm.

6. The thermal insulating sheet material of claim 1, wherein the ceramic fibers have an average fiber length of about 0.5 to about 50 mm.

7. The thermal insulating sheet material of claim 1, wherein the thermal insulating sheet material is a single-layer thermal insulating material.

8. The thermal insulating sheet material of claim 1, wherein the bulk portion comprises a needle punched laminate.

9. The thermal insulating sheet material of claim 1, wherein said thermal insulating sheet material is in the form of a mounting mat and exhibits (i) a bulk density sufficient to hold a pollution control element in place within a pollution control device, and (ii) a tensile strength and elongation that enables said thermal insulating sheet material to endure being wound around the pollution control element.

10. The thermal insulating sheet material of claim 1, wherein the bulk portion comprises a laminate of ceramic fibers.

11. The thermal insulating sheet material of claim 10, wherein the bulk portion comprises a laminate of ceramic fibers comprising crystalline alumina fibers.

12. The thermal insulating sheet material of claim 11, wherein the bulk portion comprises a needle punched laminate of crystalline alumina fibers.

13. A method of making a thermal insulating sheet material comprising a bulk portion composed mainly of ceramic fibers substantially free of an organic substance, and a surface portion wherein the ceramic fibers are at least partially fused together and have non-sharp tips, said thermal insulating sheet material being in a sheet form that can be handled and wrapped around a pollution control element before being disposed in a pollution control device, said method comprising:
preparing a thermally insulating material body comprising ceramic fibers; and
heating a surface portion of the body to a temperature higher than a deformation temperature of the ceramic fibers.

14. The method of claim 13, wherein the deformation temperature is about 1594° C. to about 1840° C.

15. The method of claim 8, wherein said heating step comprises heating top and back surface portions of the body.

16. The method of claim 13, further comprising:
calcinating the thermally insulating material body.

17. A pollution control device comprising:
a casing,
a pollution control element disposed in said casing, and
a thermal insulating sheet material comprising a bulk portion composed mainly of ceramic fibers substantially free of an organic substance, and a surface portion wherein the ceramic fibers are at least partially fused together and have non-sharp tips, said thermal insulating sheet material being in a sheet form that can be handled and wrapped around a pollution control element before being disposed in a pollution control device, said sheet meterial being disposed between said casing and said pollution control element.

18. A pollution control device comprising:
a casing,
a pollution control element disposed in said casing, and a thermally insulating sheet material disposed between said casing and said pollution control element, said thermally insulating sheet material comprising:

a bulk portion composed mainly of ceramic fibers substantially free of an organic substance; and a surface portion wherein the ceramic fibers are at least partially fused together and have non-sharp tips;

said thermal insulating sheet material being in a sheet form that can be handled and wrapped around said pollution control element before being mounted in said casing.

19. The pollution control device of claim 18, wherein the ceramic fibers maintain heat resistance and elasticity at temperatures higher than 900° C.

20. The pollution control device of claim 18, wherein the ceramic fibers have a deformation temperature below about 1594° C.

21. The pollution control device of claim 18, wherein the ceramic fibers have a deformation temperature below about 1840° C.

22. The pollution control device of claim 18, wherein the ceramic fibers comprise crystalline alumina fibers.

23. The pollution control device of claim 18, wherein the thermal insulating sheet material is a single-layer thermal insulating material.

24. The pollution control device of claim 18, wherein the pollution control element is a catalyst support and the pollution control device is a catalytic converter.

25. A method of supporting a pollution control element within a pollution control device, said method comprising:

providing a thermal insulating sheet material comprising a bulk portion composed mainly of ceramic fibers substantially free of an organic substance, and a surface portion wherein the ceramic fibers are at least partially fused together and have non-sharp tips, said thermal insulating sheet material being in a sheet form that can be handled and wrapped around a pollution control element before being disposed in a pollution control device;

winding the thermal insulating sheet material around the pollution control element; and positioning the pollution control element within a casing of the pollution control device such that the thermal insulating sheet material is disposed between the pollution control element and the casing.

* * * * *

UNITED STATES PATENT AND TRADEMARK OFFICE
CERTIFICATE OF CORRECTION

PATENT NO. : 7,524,546 B2
APPLICATION NO. : 10/450868
DATED : April 28, 2009
INVENTOR(S) : Takuma Aizawa Page 1 of 1

It is certified that error appears in the above-identified patent and that said Letters Patent is hereby corrected as shown below:

Column 12
Line 6, delete "cepiolite" and insert -- sepiolite --, therefor.
Line 30, delete "aggregating-agent" and insert -- aggregating agent --, therefor.
Line 31, delete "cepiolite," and insert -- sepiolite, --, therefor.
Line 39, delete "(Cepiolite)" and insert -- (Sepiolite) --, therefor.

Column 16
Line 48, in claim 15, delete "8," and insert -- 13, --, therefor.
Line 55, in claim 17, delete "thermal" and insert -- thermally --, therefor.
Line 63, in claim 17, delete "meterial" and insert -- material --, therefor.

Signed and Sealed this

Twenty-ninth Day of September, 2009

David J. Kappos
*Director of the United States Patent and Trademark Office*